United States Patent [19]
Daspit

[11] 4,039,211
[45] Aug. 2, 1977

[54] COUPLER FOR LIQUID AND GASEOUS FLUID PIPING

[76] Inventor: Ronald Albert Daspit, 2401 Delille St., Chalmette, La. 70043

[21] Appl. No.: 378,182

[22] Filed: July 11, 1973

[51] Int. Cl.² .............................................. F16L 27/00
[52] U.S. Cl. ................................... 285/184; 285/348; 285/372
[58] Field of Search ............... 285/372, 369, 356, 348, 285/223, 184, 230, 231, 418, 342, 337, 283, 346, 368, 374

[56] References Cited
U.S. PATENT DOCUMENTS

| | | | |
|---|---|---|---|
| 407,681 | 7/1889 | Potts | 285/184 |
| 675,730 | 6/1901 | Hommon | 285/231 |
| 782,482 | 2/1905 | Brockett | 285/231 |
| 857,905 | 6/1907 | Putnam | 285/184 X |
| 2,561,887 | 7/1951 | Risley | 285/348 X |
| 3,393,931 | 6/1968 | Wurzburger | 285/382.7 X |
| 3,862,771 | 1/1975 | Schwarz | 4/197.3 |

*Primary Examiner*—Dave W. Arola
*Attorney, Agent, or Firm*—Charles Richard Werner

[57] ABSTRACT

A coupler for joining the ends of pipes and ducts used for liquids and gaseous fluids, such as are carried in pipelines and the like, particularly where used in underwater locations, the coupler providing for angular relation between adjacent pipes to follow the contour of the bottom on which placed, the construction of the coupler facilitating its placement and providing a positive seal against leakage.

3 Claims, 4 Drawing Figures

COUPLER FOR LIQUID AND GASEOUS FLUID PIPING

BACKGROUND OF THE INVENTION

The great development achieved by underwater oil well exploitation is well known and has brought about the need for new apparatus and techniques to meet the requirements of this field of endeavor. Pipelines from the well to the shore for carrying the liquid and gaseous hydrocarbons were needed as were special couplers for the suitable joining of the lengths of pipe which generally were not aligned but which had to follow the contour of the floor of the underwater area in which installed.

Specifically in the case of underwater use of these couplers they require a very efficient design and quick and easy placement, as well as a tight seal to prevent escape of fluids from the pipeline with attendant contamination of the water in which the pipe is layed.

Quick and easy placement is essential because the couplers must be installed by underwater divers and time is of essence in their work.

Although there exist in the prior art various couplers of greater or lesser complexity for the same purpose, they all have certain deficiencies, both in operational characteristics and in installation procedures.

Insofar as I am aware presently available couplers for the same purpose as mine do not provide an adequate seal for underwater use whereas my coupler is capable of providing an almost perfect seal for joining the ends of underwater piping.

THE INVENTION

Essentially, the invention comprehends the improvement in couplers for underwater lines and ducts used for carrying liquids or gaseous fluids, providing for the joining of adjacent ends of lengths of pipe to achieve among other advantajes, the possibility of an angular relationship between the adjacent ends of pipe, a parallel aligning relation of the holding caps on the coupler, and more positive sealing between the coupler and the pipe ends.

The invention further provides an improved device of a simplified design which greatly reduces the cost of manufacture, without diminishing the above described improved features.

Furthermore, the invention provides by means of the internal space design thereof, joining of the ends of the pipes in an angular relation depending on the slope of the sea floor, inasmuch as the sea floor is seldom flat.

Another object of the invention is to provide a coupler for liquid or gas pipelines, comprising hermetically sealed joints retained in postion by means of alignable caps.

In an alternate construction where the coupler is used with pipes which may vary considerably in size, said coupler is manufactured with a greater than normal tolerance, and means are provided in the hermetical seals to take up any differences in sizes of tubes or pipes and yet retain a positive sealing action.

With the above objects in mind and others which will be apparent hereinafter, the invention consists of improvements in the design, construction and functional combination of elements which comprise a coupler for pipes or ducts for liquid or gaseous fluid as hereinafter described and illustrated in the drawing, it being understood that such description and drawings are illustrative only, as changes and modifications can be made without departing from the spirit of my invention.

DESCRIPTION OF A PREFERRED EMBODIMENT OF THE INVENTION

Figure 1:
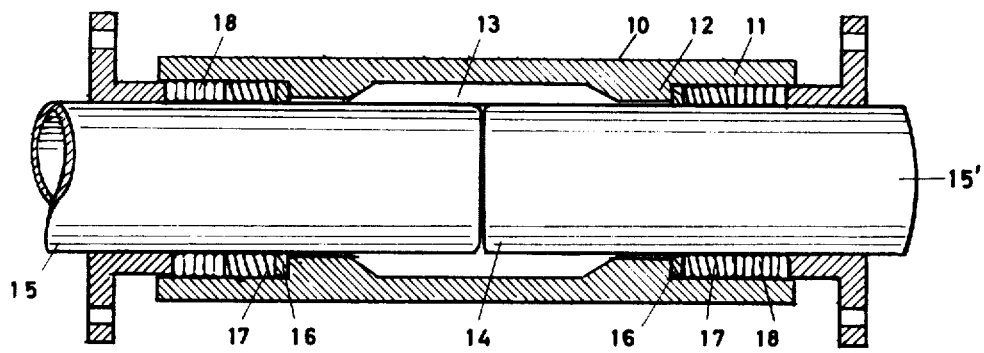
FIG. 1 is a longitudinal cross sectional view, partially in elevation of a coupler constructed according to one embodiment of my invention, illustrating the relative position of the coupling cylinder, the alignable caps or covers and the hermetic packings, all shown in operative relationship with regard to the adjacent ends of two lengths of pipe.

Referring now to the drawing by numerals of reference, the coupler for pipes or ducts for liquid or gaseous fluids comprises substantially the provision of a tubular cylindrical member 10 with recessed ends 11 and annular internal reduced diameter projection 12 providing a shoulder for the purpose hereinafter described. Centrally located midway between the shoulders or projections 12 is an annular space 13 which permits the relative angular displacement of the ends of the pipe or duct to be coupled as will be seen hereinafter.

The cylindrical tubular member 10 due to its configuration and design allows for the suitable coupling of the free ends 14 of the pipe 15 and 15', which because of inequalities and inclinations in the seafloor on which the pipe is installed, are difficult to align, almost invariably are offset angularly, or deviate in relation to the longitudinal axis of the pipeline.

The design and construction of the cylindrical tubular member 10 facilitates to a great extent the installation of the coupling assembly, which of necessity must be done underwater and at various depths, as said coupling, during the assembly process touches only momentarily the pipe wall through its inner projections or shoulders 12.

The coupling includes watertight gaskets 16, preferably of glass fibers, Teflon or any other comparable suitable material of limited deformation, said coupling also including watertight gaskets 17 preferably in the form of a cord made of neoprene or other suitable material which is resistant to hydrocarbons and is pressure deformable by virtue of the pressure exerted against said gasket by the alignable caps.

The recessed ends 11 of the coupling member 10 are adapted to receive the alignment rings 18, the inner end 19 of each alignment ring being in perpendicular relation to the longitudinal axis of the coupling member and the outer end 20 of each alignment ring which corresponds to alignable caps having a plane inclined with respect to the longitudinal axis of the coupling member.

Figure 2:
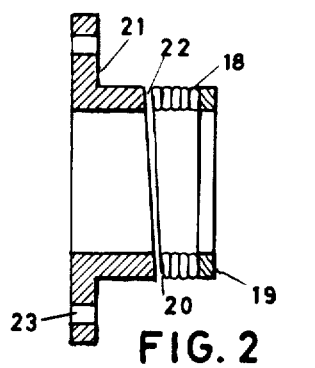
FIG. 2 is a disassociated cross sectional view of the alignable cap and the aligning ring employed at the ends of the coupling cylinder.
Figure 2A:
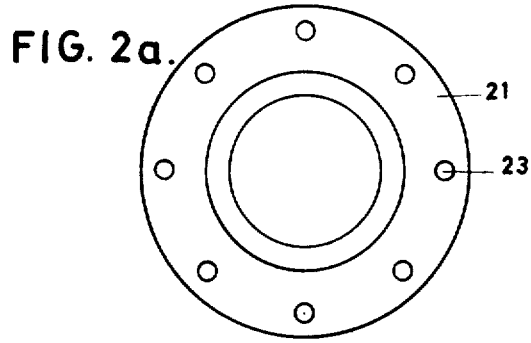
FIG. 2a is a front elevational view of the alignable cap of FIG. 2.

The alignment rings 18 may be rotated to the most suitable position to permit the parallel alignment of the caps 21, with said caps having an inner end 22 which also provides an inclined plane in relation to the longitudinal axis of the coupling member, as can be seen in FIG. 2 of the drawing.

Providing the inclined planes 20 and 22 on alignment ring 18 and in the alignable cap 21, permits by their relative position any angular placement of the pipe 15 and 15' in such manner that the caps 21 will always be in a parallel relation with each other, permitting adequate tightening thereof without distortion or unequal stresses.

Securing of the alignable caps 21 is achieved by means of a plurality of apertures 23 in said caps adapted to receive bolts 24 which hold the caps rigidly in position by tightening the nuts 24' on said bolts, thus moving the caps into sealing position.

Movement of the caps 21 over the ends of the pipe 15 and 15' results in the internal displacement of the alignment rings 18 and provides a constant pressure on the watertight gaskets 16 and 17, with gaskets 17 being subjected to a more noticeable deformation to prevent any leakage of liquid or gaseous fluid under pressure flowing through the pipeline 15-15'.

In any specific installation the only variable factor would be the size of the watertight seal 16 and 17, which would have to be hand tooled according to the differences encountered in the size of the pipe 15-15'.

SUMMARY OF THE INVENTION

As can be readily visualized from the drawing and reference to the previous description, the coupler member is of a very simple design but insofar as I am aware is completely different and novel from anything in the prior art or available on the market. The novel design reduces the cost of the coupler member and permits underwater installation with considerable ease compared to present day existing devices, eliminating the inherent complications encountered by use of tubular couplers of conventional design now in use in underwater pipeline installations.

Figure 3:
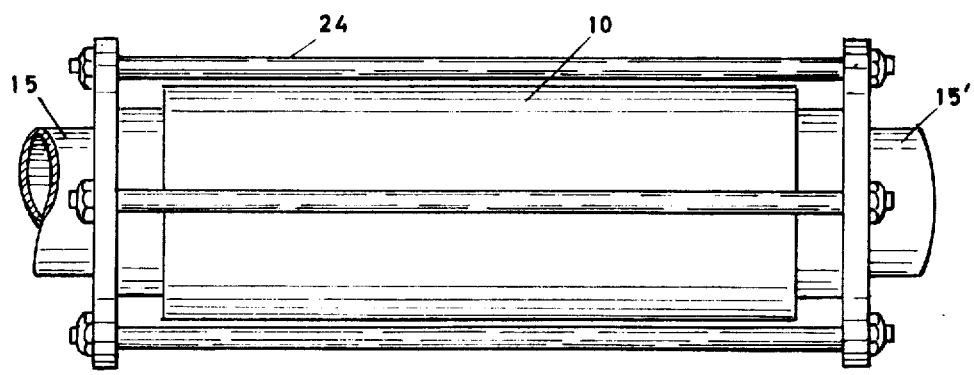
FIG. 3 is a longitudinal elevational view of the improved coupler comprising my invention showing the aligned arrangement of the caps and the bolts for securing the caps.

With my invention it is sufficient to place the components thereof in proper sequence during installation to attain their relative positioning as shown in FIGS. 1 and 3, tightening the nuts on the bolts to apply tension to the angular portions of the alignable caps, resulting in subjecting the fluid tight gaskets or seals to proper compression and in the rigid and suitable coupling of the free ends of the pipe 15 and 15'.

It is also obvious that in the event that leaks are detected when pressure-testing the pipeline, it is possible to place new gaskets or add additional gaskets to correct such leakage without dismantling the entire coupling member. This clearly results in a significantly lower installation or repair cost when considering the time required for the operation, underwater operations being considerable more costly per hour than normal labor costs.

It is obvious that changes in form proportion or details of the invention may be resorted to without departing from the spirit of my invention, and I reserve all rights which fall within the scope of these specifications and the claims which follow.

I claim:

1. In a coupler for liquid and gaseous fluid ducts, comprising a cylinder open at both ends, and having inner and outer walls, said cylinder being provided on said inner wall axially inwardly from the ends with inner backup projection means for reception of corresponding ends of pipe lengths; packing means in each of the cylinder ends backing against the projection means of the cylinder; alignable rings provided with an end perpendicular to the longitudinal axis of the cylinder and bearing against the packing means; the other end of the alignable rings being planar and lying at an angle to said longitudinal axis, alignable caps provided with a perpendicular peripheral projection and an inner longitudinal projection, with an inclined plane end corresponding and operative with the inclined end of the alignable rings, and throughbolt means for the assembly securing the alignable caps in adjusted position to deform the packing means into sealing engagement with the cylinder and pipe lengths.

2. In a coupler for liquid and gaseous fluid ducts as claimed in claim 1, said inner projection means forming, with the inner cylindrical wall, located between said projection means, an inner free space allowing a certain angular arrangement between the pipe lengths.

3. In a coupler for liquid and gaseous fluid ducts as claimed in claim 2, at least one of said packing means at each end of the coupler being capable of being hand-tooled to size to conform with the actual diameter of the fluid duct to compensate for variations in the size of said fluid duct.

* * * * *